US010116545B2

(12) United States Patent
Yu et al.

(10) Patent No.: US 10,116,545 B2
(45) Date of Patent: Oct. 30, 2018

(54) METHOD, DEVICE AND SYSTEM FOR PROCESSING OAM PACKET

(71) Applicant: HUAWEI TECHNOLOGIES CO., LTD., Shenzhen (CN)

(72) Inventors: Zhiqiang Yu, Shenzhen (CN); Guoyi Chen, Beijing (CN); Lianshu Zheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 206 days.

(21) Appl. No.: 14/813,882

(22) Filed: Jul. 30, 2015

(65) Prior Publication Data

US 2015/0341250 A1    Nov. 26, 2015

Related U.S. Application Data

(63) Continuation of application No. PCT/CN2014/071739, filed on Jan. 29, 2014.

(30) Foreign Application Priority Data

Jan. 31, 2013  (CN) .......................... 2013 1 0038824

(51) Int. Cl.
*H04L 12/26* (2006.01)
*H04L 12/741* (2013.01)

(52) U.S. Cl.
CPC .............. *H04L 43/12* (2013.01); *H04L 43/10* (2013.01); *H04L 45/745* (2013.01); *H04L 43/08* (2013.01)

(58) Field of Classification Search
CPC ......... H04L 43/12; H04L 43/10; H04L 12/26; H04L 41/00; H04L 45/745
See application file for complete search history.

(56) References Cited

U.S. PATENT DOCUMENTS

2010/0034205 A1   2/2010 Kusama et al.
2010/0217882 A1   8/2010 Yang
(Continued)

FOREIGN PATENT DOCUMENTS

CN    101426004   5/2009
CN    101741592   6/2010
(Continued)

OTHER PUBLICATIONS

Extended European Search Report dated Oct. 19, 2015 in corresponding European Patent Application No. 14746130.5.
McKeown et al., "OpenFlow: Enabling Innovation in Campus Networks", ACM SIGCOMM Computer Communication Review, Vo. 38, No. 2, Apr. 2008, pp. 69-74.
(Continued)

*Primary Examiner* — Ricky Q Ngo
*Assistant Examiner* — Stephen N Steiner
(74) *Attorney, Agent, or Firm* — Staas & Halsey LLP (57) ABSTRACT

Embodiments of the present application provide a method, device, and system for processing an OAM packet, where the method for processing an OAM packet includes: receiving, by a first network device, an operation, administration and maintenance (OAM) instruction sent by an OAM server, where the OAM instruction carries first format information and a first sending target identifier, where the first format information is used for indicating an OAM packet format; and generating, by the first network device, a first OAM packet according to the first format information, and sending the first OAM packet to a network device indicated by the first sending target identifier. The method, device, and system for processing an OAM packet provided in the embodiments of the present application achieve adaptability to different OAM standards without changing of a hardware structure of a network device, and improve OAM processing flexibility.

8 Claims, 7 Drawing Sheets

(56) References Cited

U.S. PATENT DOCUMENTS

| | | | |
|---|---|---|---|
| 2012/0287795 A1 | 11/2012 | Mohan et al. | |
| 2013/0010600 A1* | 1/2013 | Jocha | H04L 43/026 370/236.2 |
| 2013/0163475 A1* | 6/2013 | Beliveau | H04L 67/327 370/257 |
| 2014/0169179 A1* | 6/2014 | Ding | H04L 43/0811 370/241.1 |
| 2015/0263892 A1* | 9/2015 | John | H04L 41/0806 370/236.2 |

FOREIGN PATENT DOCUMENTS

| | | |
|---|---|---|
| CN | 101897151 | 11/2010 |
| CN | 102055598 | 5/2011 |
| CN | 103078791 | 5/2013 |
| WO | 2012/177213 A2 | 12/2012 |
| WO | 2014/020379 A1 | 2/2014 |

OTHER PUBLICATIONS

European Office Action dated Jul. 27, 2016 in corresponding European Patent Application No. 14 746 130.5.

Chinese Office Action dated Mar. 23, 2015 in corresponding Chinese Patent Application No. 201310038824.3.

PCT International Search Report dated May 6, 2014 in corresponding International Patent Application No. PCT/CN2014/071739.

"Series G: Transmission Systems and Media, Digital Systems and Networks, Packet over Transport aspects—Ethernet over Transport aspects", ITU-T, G.8013/Y1731, Amendment 1, May 2012, 16 pp.

"IEEE Standard for Local and metropolitan area networks—Virtual Bridged Local Area Networks, Amendment 7: Provider Backbone Bridges", Jun. 12, 2008, 110 pp.

"IEEE Standard for Local and metropolitan area networks—Virtual Bridged Local Area Networks, Amendment 5: Connectivity Fault Management", IEEE Computer Society, Dec. 17, 2007, 260 pp.

International Search Report dated May 6, 2014, in corresponding International Application No. PCT/CN2014/071739.

* cited by examiner

METHOD, DEVICE AND SYSTEM FOR PROCESSING OAM PACKET

CROSS-REFERENCE TO RELATED APPLICATIONS

This application is a continuation of International Application No. PCT/CN2014/071739, filed on Jan. 29, 2014, which claims priority to Chinese Patent Application No. 201310038824.3, filed on Jan. 31, 2013, both of which are hereby incorporated by reference in their entireties.

TECHNICAL FIELD

Embodiments of the present application relate to communications technologies, and in particular, to a method, device and system for processing an OAM packet.

BACKGROUND

Operation, administration and maintenance (Operation, Administration and Maintenance, OAM for short) is an effective supplement to an interface/link protocol, and provides the interface/link protocol with an operation, administration and maintenance mechanism. An OAM function generally includes continuity check, performance measurement, fault location, and the like, which are performed on a link or a path.

In the prior art, an OAM standard about a link often lags behind a standard about the link, and an OAM function generally needs to be supported by link processing hardware, as a result, when an OAM standard is introduced, many devices are incapable of supporting the OAM function, and even if the OAM function is added in a later phase, different devices use different methods for processing an OAM packet, and therefore, there is an urgent need to put forward a flexible method for processing an OAM packet, so as to adapt to a release of the OAM standard and to different devices.

SUMMARY

Embodiments of the present application provide a method, device, and system for processing an OAM packet, so as to improve OAM processing flexibility.

According to a first aspect, an embodiment of the present application provides a method for processing an OAM packet, including:

receiving, by a first network device, an operation, administration and maintenance (OAM) instruction sent by an OAM server, where the OAM instruction carries first format information and a first sending target identifier, where the first format information is used for indicating an OAM packet format; and generating, by the first network device, a first OAM packet according to the first format information, and sending the first OAM packet to a network device indicated by the first sending target identifier.

In a first possible implementation manner of the first aspect, the method for processing an OAM packet further includes:

receiving, by the first network device, a second OAM packet sent by a second network device, and sending the second OAM packet to the OAM server, so that the OAM server performs OAM processing according to the second OAM packet.

In a second possible implementation manner of the first aspect, the method for processing an OAM packet further includes:

receiving, by the first network device, a second OAM packet sent by a second network device; and if the first network device does not store an OAM flow table corresponding to the second OAM packet, sending the second OAM packet to the OAM server, receiving a flow table constructing instruction sent by the OAM server, and constructing an OAM flow table according to the flow table constructing instruction, where the OAM flow table includes a matching entry used for matching an OAM packet.

With reference to the second possible implementation manner of the first aspect, in a third possible implementation manner of the first aspect, the method for processing an OAM packet further includes:

if the first network device stores the OAM flow table corresponding to the second OAM packet, updating a recording result according to the second OAM packet; and sending, by the first network device, the recording result to the OAM server, so that the OAM server performs OAM processing according to the recording result.

With reference to the first to third possible implementation manners of the first aspect, in a fourth possible implementation manner of the first aspect, the first format information includes at least one of the following:

packet sending frequency information, packet sending quantity information, time stamp information, counting information, and checking information.

According to a second aspect, an embodiment of the present application provides a method for processing an OAM packet, including:

generating, by an operation, administration and maintenance (OAM) server, an OAM instruction, where the OAM instruction carries first format information and a first sending target identifier, where the first format information is used for indicating an OAM packet format; and sending, by the OAM server, the OAM instruction to a first network device, so that the first network device generates a first OAM packet according to the first format information, and sends the first OAM packet to a network device indicated by the first sending target identifier.

In a first possible implementation manner of the second aspect, the method for processing an OAM packet further includes:

receiving, by the OAM server, a second OAM packet sent by the first network device, and performing OAM processing according to the second OAM packet.

In a second possible implementation manner of the second aspect, the method for processing an OAM packet further includes:

receiving, by the OAM server, a second OAM packet sent by the first network device, and sending a flow table constructing instruction to the first network device according to the second OAM packet, so that the first network device constructs an OAM flow table according to the flow table constructing instruction, where the OAM flow table includes a matching entry used for matching an OAM packet.

With reference to the second possible implementation manner of the second aspect, in a third possible implementation manner of the second aspect, the method for processing an OAM packet further includes:

receiving, by the OAM server, a recording result sent by the first network device, and performing OAM processing according to the recording result.

With reference to the first to third possible implementation manners of the second aspect, in a fourth possible implementation manner of the second aspect, the first format information includes at least one of the following:

packet sending frequency information, packet sending quantity information, time stamp information, counting information, and checking information.

According to a third aspect, an embodiment of the present application provides a first network device, including:

an instruction receiving unit, configured to receive an operation, administration and maintenance (OAM) instruction sent by an OAM server, where the OAM instruction carries first format information and a first sending target identifier, where the first format information is used for indicating an OAM packet format; and a first processing unit, configured to generate a first OAM packet according to the first format information, and send the first OAM packet to a network device indicated by the first sending target identifier.

In a first possible implementation manner of the third aspect, the first network device further includes:

a packet forwarding unit, configured to receive a second OAM packet sent by a second network device, and send the second OAM packet to the OAM server, so that the OAM server performs OAM processing according to the second OAM packet.

In a second possible implementation manner of the third aspect, the first network device further includes:

a packet receiving unit, configured to receive a second OAM packet sent by a second network device; and a second processing unit, configured to: if an OAM flow table corresponding to the second OAM packet is not stored, send the second OAM packet to the OAM server, receive a flow table constructing instruction sent by the OAM server, and construct an OAM flow table according to the flow table constructing instruction, where the OAM flow table includes a matching entry used for matching an OAM packet.

With reference to the second possible implementation manner of the third aspect, in a third possible implementation manner of the third aspect, the second processing unit is further configured to: if the OAM flow table corresponding to the second OAM packet is stored, update a recording result according to the second OAM packet; and send the recording result to the OAM server, so that the OAM server performs OAM processing according to the recording result.

With reference to the first to third possible implementation manners of the third aspect, in a fourth possible implementation manner of the third aspect, the first format information includes at least one of the following:

packet sending frequency information, packet sending quantity information, time stamp information, counting information, and checking information.

According to a fourth aspect, an embodiment of the present application provides an OAM server, including:

an instruction generating unit, configured to generate an operation, administration and maintenance (OAM) instruction, where the OAM instruction carries first format information and a first sending target identifier, where the first format information is used for indicating an OAM packet format; and an instruction sending unit, configured to send the OAM instruction to a first network device, so that the first network device generates a first OAM packet according to the first format information, and sends the first OAM packet to a network device indicated by the first sending target identifier.

In a first possible implementation manner of the fourth aspect, the OAM server further includes:

a first processing unit, configured to receive a second OAM packet sent by the first network device and perform OAM processing according to the second OAM packet.

In a second possible implementation manner of the fourth aspect, the OAM server further includes:

a second processing unit, configured to receive a second OAM packet sent by the first network device, and send a flow table constructing instruction to the first network device according to the second OAM packet, so that the first network device constructs an OAM flow table according to the flow table constructing instruction, where the OAM flow table includes a matching entry used for matching an OAM packet.

With reference to the second possible implementation manner of the fourth aspect, in a third possible implementation manner of the fourth aspect, the second processing unit is further configured to receive a recording result sent by the first network device and perform OAM processing according to the recording result.

With reference to the first to third possible implementation manners of the fourth aspect, in a fourth possible implementation manner of the fourth aspect, the first format information includes at least one of the following:

packet sending frequency information, packet sending quantity information, time stamp information, counting information, and checking information.

According to a fifth aspect, an embodiment of the present application provides a system for processing an OAM packet, including:

the first network device provided in the embodiment of the present application; and the OAM server provided in the embodiment of the present application.

It can be known from the foregoing technical solutions that, according to the method, device, and system for processing an OAM packet provided in the embodiments of the present application, a first network device receives an OAM instruction sent by an OAM server, where the OAM instruction carries first format information and a first sending target identifier, where the first format information is used for indicating an OAM packet format, and the first network device generates a first OAM packet according to the first format information, and sends the first OAM packet to a network device indicated by the first sending target identifier. The first network device can generate an OAM packet according to the format information carried in the OAM instruction that is sent by the OAM server, and for a different network device, send format information adapted to the network device, so that the network device can adapt to different OAM standards without changing of a hardware structure of the network device as long as a corresponding OAM processing capability is reserved in the network device, which greatly improves OAM processing flexibility.

BRIEF DESCRIPTION OF DRAWINGS

To describe the technical solutions in the embodiments of the present application more clearly, the following briefly introduces the accompanying drawings required for describing the embodiments. Apparently, the accompanying drawings in the following description show some embodiments of the present application, and persons of ordinary skill in the art may still derive other drawings from these accompanying drawings without creative efforts.

DESCRIPTION OF EMBODIMENTS

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are a part rather than all of the embodiments of the present application. All other embodiments obtained by persons of ordinary skill in the art based on the embodiments of the present application without creative efforts shall fall within the protection scope of the present application.

Figure 1:
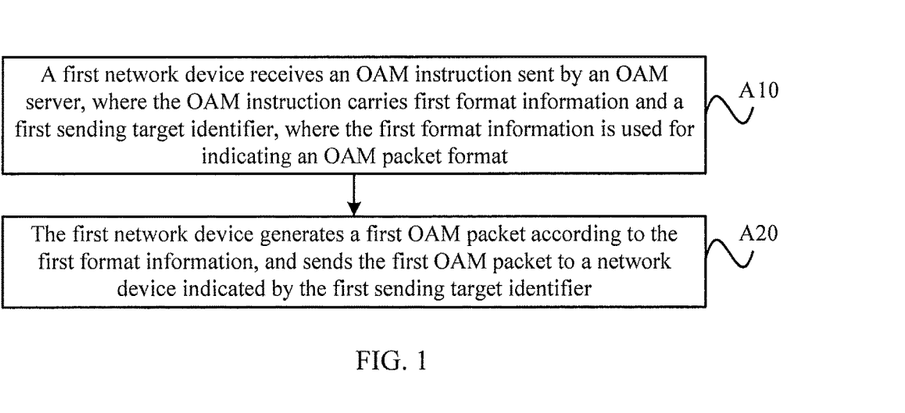
FIG. 1 is a flowchart of a first method for processing an OAM packet according to an embodiment of the present application.

FIG. 1 is a flowchart of a first method for processing an OAM packet according to an embodiment of the present application. As shown in FIG. 1, the method for processing an OAM packet provided in the embodiment may specifically be applied to an OAM processing process of a network device, where the network device may specifically be a network element, which needs to implement an OAM function, on a network. The method for processing an OAM packet provided in the embodiment specifically includes:

Step A10. A first network device receives an operation, administration, and maintenance (OAM) instruction sent by an OAM server, where the OAM instruction carries first format information and a first sending target identifier, where the first format information is used for indicating an OAM packet format.

Step A20. The first network device generates a first OAM packet according to the first format information, and sends the first OAM packet to a network device indicated by the first sending target identifier.

Specifically, the OAM server is configured to implement an OAM function, such as detection control and processing of a link or a path on a network, where detection of a link or a path may include continuity check, performance measurement, fault location, and the like. When the OAM server needs to detect a link on the network, the OAM server sends an OAM instruction to an end point of the link, for example, if the end point is the first network device, the OAM server sends the OAM instruction to the first network device, where the OAM instruction carries first format information and a first sending target identifier, the first format information is specifically used for indicating an OAM packet format, and for different network devices, content included in the first format information may be different. Correspondingly, formats of first OAM packets generated by different network devices according to the first format information may also be different. The first sending target identifier may be a port number of an outbound port, a link number of a link, or the like of the first network device, and a sending object may be determined according to the first sending target identifier. In this way, the first network device may generate, according to an instruction of the OAM server, a packet in a needed OAM format, such as Ethernet (Ethernet) OAM, MPLS (Multi-Protocol Label Switching, Multi-Protocol Label Switching) OAM, IP (Internet Protocol, Internet Protocol) OAM, or ICMP (Internet Control Message Protocol, Internet Control Message Protocol) OAM.

The first network device receives the OAM instruction, generates, according to the first format information, the first OAM packet that meets a format requirement from the first format information, and sends the first OAM packet to a corresponding network device according to the first sending target identifier. In an actual application process, the first format information may include packet sending frequency information and packet sending quantity information, so that the first network device may send a group of first OAM packets according to a frequency indicated by the packet sending frequency information, where a quantity of the first OAM packets in the group is a quantity indicated by the packet sending quantity information. Correspondingly, a field may be set in the first OAM packet, so as to identify a sequence number of the first OAM packet in the group of packets.

The network device that receives the first OAM packet may send a response to the first network device, so that the first network device may learn a receiving situation of the first OAM packet, and if link detection authority is delegated to a network device, the first network device may parse the received response to learn the receiving situation of the first OAM packet and determine network quality parameters, such as a delay and packet loss rate, so as to implement continuity check and performance measurement of the link.

The network device that receives the first OAM packet may also directly send the first OAM packet to the OAM server, and because link detection is initiated by the OAM server, the OAM server may parse the first OAM packet to learn the network quality parameters, such as a delay and packet loss rate, so as to implement continuity check and performance measurement of the link.

When the OAM server further intends to detect a link between the network device that receives the first OAM packet and a next-hop network device of the network device, the OAM server may further send an OAM instruction to the network device that receives the first OAM packet, where the OAM instruction carries second format information and a second sending target identifier, where the first format information is used for indicating an OAM packet format. The network device that receives the first OAM packet may further generate a third OAM packet according to the second format information, and send the generated third OAM packet to the next-hop network device, namely, a network device indicated by the second sending target identifier. When the network device that receives the first OAM packet has an OAM function implementation manners different from that of the first network device, content of the second format information and content of the first format information may be different.

According to the method for processing an OAM packet provided in the embodiment, a first network device receives an OAM instruction sent by an OAM server, where the OAM instruction carries first format information and a first sending target identifier, where the first format information is used for indicating an OAM packet format. The first network device generates a first OAM packet according to the first format information, and sends the first OAM packet to a network device indicated by the first sending target identifier. The first network device may generate an OAM packet according to format information carried in the OAM instruction that is sent by the OAM server, and for a different network device, send format information adapted to the network device, so that the network device can adapt to different OAM standards without changing of a hardware structure of the network device as long as a corresponding OAM processing capability is reserved in the network device, which greatly improves OAM processing flexibility.

Figure 2:
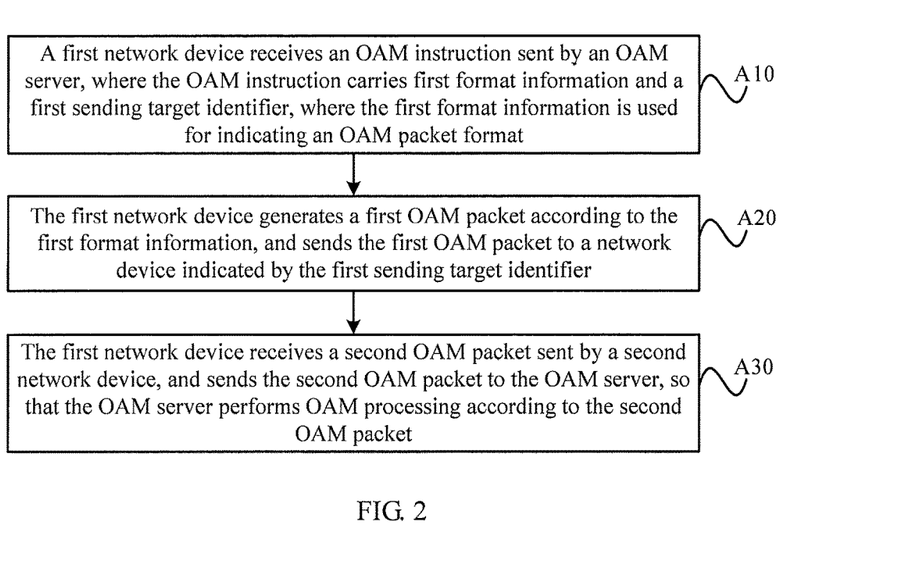
FIG. 2 is a flowchart of a second method for processing an OAM packet according to an embodiment of the present application.

FIG. 2 is a flowchart of a second method for processing an OAM packet according to an embodiment of the present application. As shown in FIG. 2, in the embodiment, the method for processing an OAM packet further includes:

Step A30. The first network device receives a second OAM packet sent by a second network device, and sends the second OAM packet to the OAM server, so that the OAM server performs OAM processing according to the second OAM packet.

Specifically, the first network device may further be a network device serving as a receive end on a link, and therefore, the first network device receives the second OAM packet sent by the second network device and forwards the second OAM packet to the OAM server, so that the OAM server performs the OAM processing according to the second OAM packet. For example, if the OAM server instructs the second network device to send, at a time interval of 50 ms, a group of 200 second OAM packets to the first network device, the first network device sends received second OAM packets to the OAM server, and the OAM server receives 140 second OAM packets, so that the OAM server may determine that a packet loss rate of the link between the second network device and the first network device is 30%.

For example, the OAM server needs to detect a path from a network device A to a network device D, where the path includes three links, which are a link from the network device A to a network device B, a link from the network device B to a network device C, and a link from the network device C to the network device D. The OAM server may send an OAM instruction to the network device A, according to the OAM instruction, the network device A generates an OAM packet and sends the OAM packet to the network device B, the network device B sends the received OAM packet to the OAM server, the OAM server further sends an OAM instruction to the network device B, according to the OAM instruction, the network device B generates an OAM packet and sends the OAM packet to the network device C, the network device C sends the received OAM packet to the OAM server, the OAM server further sends an OAM instruction to the network device C, according to the OAM instruction, the network device C generates an OAM packet and sends the OAM packet to the network device D, and the network device D sends the received OAM packet to the OAM server. The OAM server may implement continuity check and performance measurement of the path according to the OAM packets that are separately received from the network device B, network device C, and network device D, and if a link on the path is faulty, fault location may further be implemented. If the detected path is a loopback path, for example, a link from the network device D to the network device A is further included, the OAM server further sends an OAM instruction to the network device D, according to the OAM instruction, the network device D generates an OAM packet and sends the OAM packet to the network device A, and the network device A sends the received OAM packet to the OAM server. The OAM server may detect the loopback path according to the OAM packets that are separately received from the network device A, network device B, network device C, and network device D.

For another example, in an actual application process, when the foregoing path from the network device A to the network device D needs to be detected, the OAM server may send an OAM instruction to the network device A, according to the OAM instruction, the network device A generates an OAM packet and sends the OAM packet to the network device B, the network device B forwards the OAM packet to the network device C, the network device C further forwards the OAM packet to the network device D, the network device D sends the received OAM packet to the OAM server, and the OAM server detects the path according to a condition of the received OAM packet.

A network device sends an OAM packet to an OAM server for a parsing process, which can greatly reduce processing complexity of the network device and achieve consistency with a network architecture of an SDN (Software Defined Network, software defined network).

It should be noted that, step A30 may be processed in parallel with step A10 and step A20, and has no inevitable timing relationship with step A10 or step A20. In addition, the foregoing method may also be used in an implementation process of another OAM function.

Figure 3:
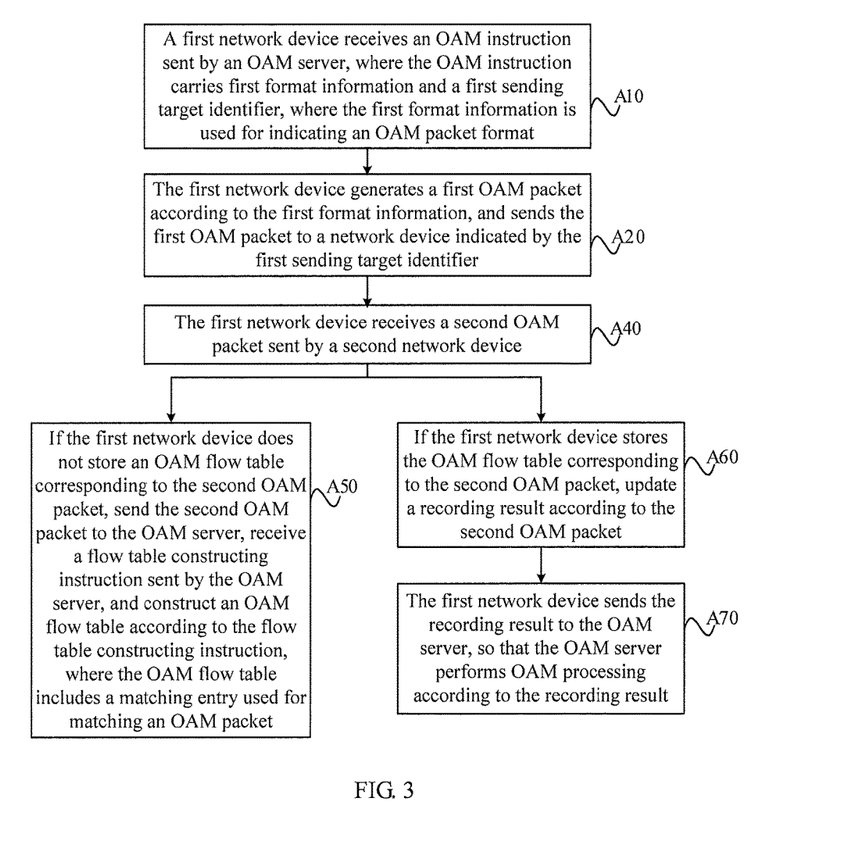
FIG. 3 is a flowchart of a third method for processing an OAM packet according to an embodiment of the present application.

FIG. 3 is a flowchart of a third method for processing an OAM packet according to an embodiment of the present application. As shown in FIG. 3, in the embodiment, the method may further include:

Step A40. The first network device receives a second OAM packet sent by a second network device.

Step A50. If the first network device does not store an OAM flow table corresponding to the second OAM packet, the first network device sends the second OAM packet to the OAM server, receives a flow table constructing instruction sent by the OAM server, and construct an OAM flow table according to the flow table constructing instruction, where the OAM flow table includes a matching entry used for matching an OAM packet.

In the embodiment, the method may further include:

Step A60. If the first network device stores the OAM flow table corresponding to the second OAM packet, the first network device updates a recording result according to the second OAM packet.

Step A70. The first network device sends the recording result to the OAM server, so that the OAM server performs OAM processing according to the recording result.

Specifically, when the first network device receives an OAM packet sent by another network device, whether a flow table corresponding to the OAM packet is stored may be determined first, and then, processing is performed according to a result of the determining.

The first network device may match several fields in the OAM packet with a matching entry in a flow table; if the matching succeeds, it indicates that the flow table corresponding to the OAM packet is stored, and if the matching fails, it indicates that the flow table corresponding to the OAM packet does not exist.

The first network device receives the second OAM packet sent by the second network device, and if the first network device does not store the flow table corresponding to the second OAM packet, the second OAM packet is sent to the OAM server, the OAM server sends the flow table constructing instruction to the first network device, and the first network device may construct an OAM flow table according to the flow table constructing instruction, where the OAM flow table includes a matching entry (Match Fields) used for matching an OAM packet. The OAM server may determine, according to the second OAM packet reported by the first network device, a stream to which the second OAM packet belongs, use several fields in the second OAM packet as the matching entry, and send the matching entry to the first network device by using the flow table constructing instruction. For a second OAM packet subsequently received by the first network device, content of preset fields in the second OAM packet is matched with the matching entry, and if the matching succeeds, the second OAM packet is recorded and a recording result is generated.

The first network device receives the second OAM packet sent by the second network device, and if the first network device stores the flow table corresponding to the second OAM packet, it indicates that the first network device has received the second OAM packet before, and the second OAM packet is recorded and a recording result is generated.

In an actual application process, in order to lower working complexity of the first network device, the first network device may record only a quantity of second OAM packets that are matched successfully, and report a recording result to the OAM server. Information, such as a receiving time and a number, about the second OAM packets that are matched successfully may also be recorded, so that the OAM server may analyze link performance according to the information. The first network device may send recording result for each second OAM packet to the OAM server, or may record information together, which is about the second OAM packets that are matched successfully, so as to obtain the recording result, and send the recording result to the OAM server. In this processing process, the first network device does not send a second OAM packet to the OAM server.

In the embodiment, the flow table generated by the first network device may include multiple flow table entries, and each flow table entry is corresponding to a flow separately. The flow table entry includes the foregoing matching entry, and may further include a corresponding operating instruction (Action). The operating instruction may also be sent to the first network device by the OAM server by using the flow table constructing instruction. The first network device may determine, according to the matching entry, a flow to which a received OAM packet belongs, and execute a corresponding operation according to the operating instruction. For example, the operating instruction may include one or one combination of the following: discard an OAM packet, directly forward an OAM packet to a next-hop node, replace a received OAM packet with an OAM packet in another format and forward the OAM packet in the another format to a next-hop node, report an OAM packet, record an OAM packet that is matched successfully and report a recording result to the OAM server, and so on.

As for how the first network device replaces a received OAM packet with an OAM packet in another format and forwards the OAM packet in the another format to a next-hop node, for example, the flow table constructing instruction may carry second format information and a second sending target identifier, where the first format information is used for indicating an OAM packet format; and after the first network device receives the flow table constructing instruction sent by the OAM server, the method may further include:

The first network device generates a third OAM packet according to the second format information, and sends the third OAM packet to a network device indicated by the second sending target identifier.

Specifically, if the OAM server needs to perform path detection, and the first network device is a node on a to-be-detected path, the flow table constructing instruction sent by the OAM server to the first network device may further carry second format information and a second sending target identifier, where the first format information is used for indicating an OAM packet format, and according to the second format information, the first network device generates the third OAM packet and sends the third OAM packet to a next-hop network device.

The OAM server may also deliver the second format information and the second sending target identifier, which serve as a part of an operating instruction, to the first network device, and the first network device may record the foregoing information in a corresponding flow table entry of the flow table.

In the embodiment, the first format information includes at least one of the following: packet sending frequency information, packet sending quantity information, time stamp information, counting information, and checking information.

Specifically, the first format information further includes one or more of the foregoing information in addition to intrinsic information of a packet. The intrinsic information of a packet may specifically be information in a fixed format. The packet sending frequency information is used for indicating a sending frequency of an OAM packet, and the packet sending quantity information is used for indicating a sending quantity of OAM packets, for example, one OAM packet is sent every 50 ms, and a group of 200 OAM packets in total is sent. The time stamp (time stamp) information may specifically indicate a sending time of an OAM packet. The counting information may specifically include a field which is used for counting, and for the first OAM packet, the field has a preset starting value, and then, a constant value is added to or deducted from the field each time an OAM packet is sent. The counting information is information such as a Sequence Number (sequence number) or a Count Value (count value) in a packet. The checking information may specifically include which part of a generated packet needs to be checked and a checking type. For example, if an IP header needs to be checked, CheckSum checking is performed only on an IP packet header. The checking type may generally include CheckSum checking or CRC (Cyclic Redundancy Check, Cyclic Redundancy Check) checking, for example, checking on an IP packet header or on a BIP16 field in MPLS OAM belongs to the CheckSum checking, and checking on an Ethernet packet belongs to the CRC checking.

It should be noted that, the first network device, the second network device, and the first to third OAM packets are only used for distinction, but are not intended to limit a sequence. The second network device may implement functions of the first network device.

Figure 4:
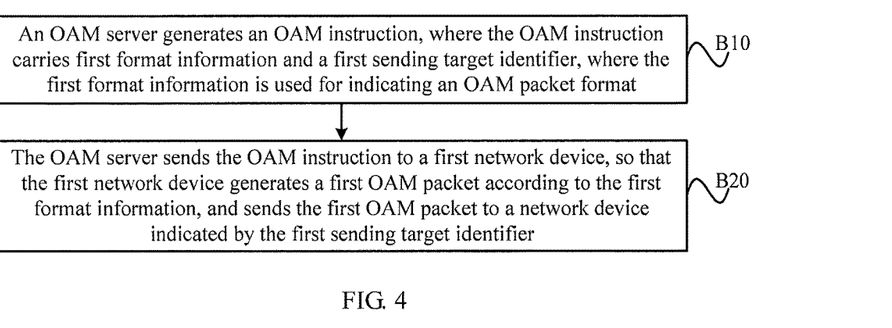
FIG. 4 is a flowchart of a fourth method for processing an OAM packet according to an embodiment of the present application.

FIG. 4 is a flowchart of a fourth method for processing an OAM packet according to an embodiment of the present application. As shown in FIG. 4, the method for processing an OAM packet provided in the embodiment of the present application may specifically be implemented in conjunction with a method that is applied to a network device side and provided in any embodiment of the present application, of which a specific implementation process is not repeatedly described herein. The method for processing an OAM packet provided in the embodiment specifically includes:

Step B10. An operation, administration and maintenance (OAM) server generates an OAM instruction, where the OAM instruction carries first format information and a first sending target identifier, where the first format information is used for indicating an OAM packet format.

Step B20. The OAM server sends the OAM instruction to a first network device, so that the first network device generates a first OAM packet according to the first format information, and sends the first OAM packet to a network device indicated by the first sending target identifier.

According to the method for processing an OAM packet provided in the embodiment, an OAM server generates an OAM instruction and sends the OAM instruction to a first network device, and the first network device can generate an OAM packet according to format information carried in the OAM instruction that is sent by the OAM server, and for a different network device, send format information adapted to the network device, so that the network device can adapt to different OAM standards without changing of a hardware structure of the network device as long as a corresponding OAM processing space is reserved in the network device, which greatly improves OAM processing flexibility.

Figure 5:
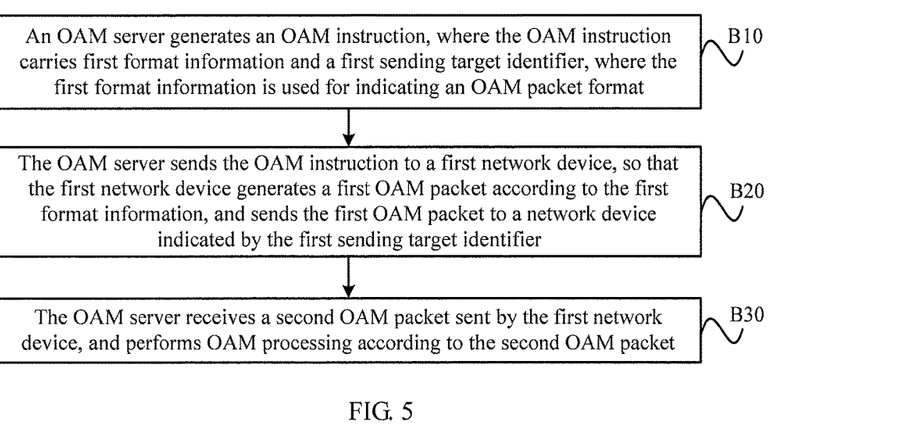
FIG. 5 is a flowchart of a fifth method for processing an OAM packet according to an embodiment of the present application.

FIG. 5 is a flowchart of a fifth method for processing an OAM packet according to an embodiment of the present application. As shown in FIG. 5, in the embodiment, the method for processing an OAM packet may further include:

Step B30. The OAM server receives a second OAM packet sent by the first network device, and performs OAM processing according to the second OAM packet.

Figure 6:
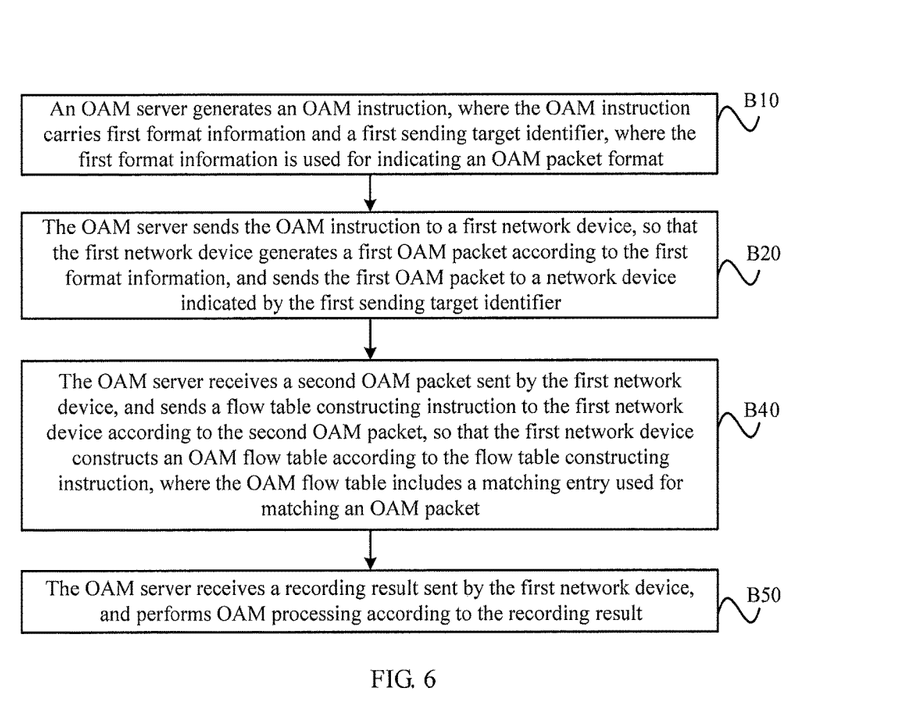
FIG. 6 is a flowchart of a sixth method for processing an OAM packet according to an embodiment of the present application.

FIG. 6 is a flowchart of a sixth method for processing an OAM packet according to an embodiment of the present application. As shown in FIG. 6, in this embodiment, the method for processing an OAM packet may further include:

Step B40. The OAM server receives a second OAM packet sent by the first network device, and sends a flow table constructing instruction to the first network device according to the second OAM packet, so that the first network device constructs an OAM flow table according to the flow table constructing instruction, where the OAM flow table includes a matching entry used for matching an OAM packet.

In this embodiment, the method for processing an OAM packet may further include:

Step B50. The OAM server receives a recording result sent by the first network device, and performs OAM processing according to the recording result.

Specifically, the OAM server may delegate OAM packet processing authority to a network device, so that the network device constructs a flow table and counts received OAM packets according to the flow table, which avoids waste of resources caused by that the network device sends all OAM packets to the OAM server for processing.

It should be noted that, step B30, step B40, and step B50 may be processed in parallel with step B10 and step B20, and have no inevitable timing relationship with step B10 or step B20.

In this embodiment, the flow table constructing instruction may further carry second format information and a second sending target identifier, where the first format information is used for indicating an OAM packet format.

The first network device may generate an OAM packet according to the second format information carried in the flow table constructing instruction, and send the generated OAM packet to a network device corresponding to the second sending target identifier.

In this embodiment, the first format information includes at least one of the following: packet sending frequency information, packet sending quantity information, time stamp information, counting information, and checking information.

Figure 7:
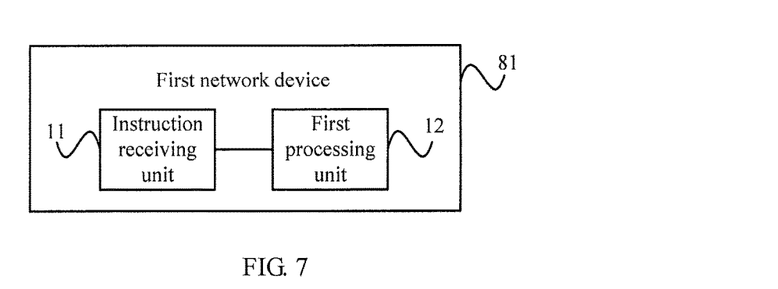
FIG. 7 is a schematic structural diagram of a first network device according to an embodiment of the present application.

FIG. 7 is a schematic structural diagram of a first network device according to an embodiment of the present application. As shown in FIG. 7, the first network device 81 provided in this embodiment can specifically implement steps of a method for processing an OAM packet that is applied to a network device and provided in any embodiment of the present application, and a specific implementation process is not repeatedly described herein. The first network device 81 provided in this embodiment specifically includes an instruction receiving unit 11 and a first processing unit 12. The instruction receiving unit 11 is configured to receive an operation, administration and maintenance (OAM) instruction sent by an OAM server, where the OAM instruction carries first format information and a first sending target identifier, where the first format information is used for indicating an OAM packet format. The first processing unit 12 is configured to generate a first OAM packet according to the first format information, and send the first OAM packet to a network device indicated by the first sending target identifier.

According to the first network device 81 provided in this embodiment, the instruction receiving unit 11 receives an OAM instruction sent by an OAM server, where the OAM instruction carries first format information and a first sending target identifier, where the first format information is used for indicating an OAM packet format, and the first processing unit 12 generates a first OAM packet according to the first format information, and sends the first OAM packet to a network device indicated by the first sending target identifier. The first network device 81 can generate an OAM packet according to the format information carried in the OAM instruction that is sent by the OAM server, and for a different network device, send format information adapted to the network device, so that the network device can adapt to different OAM standards without changing of a hardware structure of the network device as long as a corresponding OAM processing capability is reserved in the network device, which greatly improves OAM processing flexibility.

Figure 8:
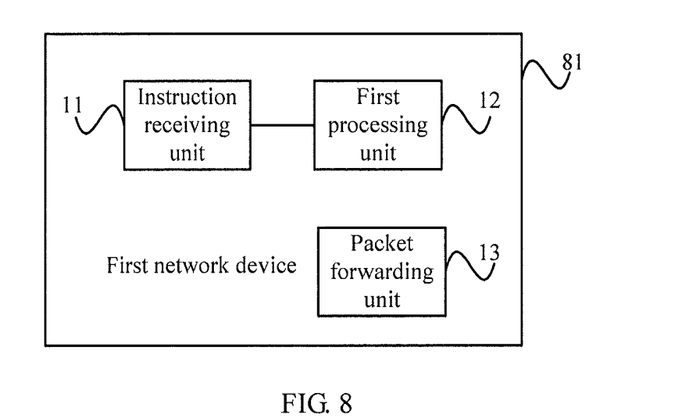
FIG. 8 is a schematic structural diagram of another first network device according to an embodiment of the present application.

FIG. 8 is a schematic structural diagram of another first network device according to an embodiment of the present application. As shown in FIG. 8, on a basis of what is shown in FIG. 7, further, the first network device 81 in this embodiment may further include a packet forwarding unit 13, where the packet forwarding unit 13 is configured to receive a second OAM packet sent by a second network device, and send the second OAM packet to the OAM server, so that the OAM server performs OAM processing according to the second OAM packet.

Figure 9:
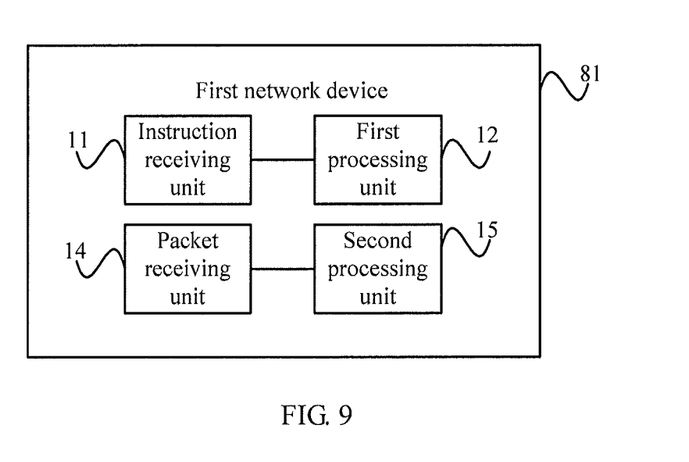
FIG. 9 is a schematic structural diagram of still another first network device according to an embodiment of the present application.

FIG. 9 is a schematic structural diagram of still another first network device according to an embodiment of the present application. As shown in FIG. 9, on a basis of what is shown in FIG. 7, further, the first network device 81 in this embodiment may further include a packet receiving unit 14 and a second processing unit 15. The packet receiving unit 14 is configured to receive a second OAM packet sent by a second network device. The second processing unit 15 is configured to: if an OAM flow table corresponding to the second OAM packet is not stored, send the second OAM packet to the OAM server, receive a flow table constructing instruction sent by the OAM server, and construct an OAM flow table according to the flow table constructing instruction, where the OAM flow table includes a matching entry used for matching an OAM packet.

In an actual implementation process, the second processing unit 15 may forward a received OAM packet to the OAM server, and when the flow table constructing instruction sent by the OAM server is received, the second processing unit 15 may stop forwarding the OAM packet to the OAM server.

In this embodiment, the second processing unit 15 may further be configured to: if the OAM flow table corresponding to the second OAM packet is stored, update a recording result according to the second OAM packet; and send the recording result to the OAM server, so that the OAM server performs OAM processing according to the recording result.

In this embodiment, the flow table constructing instruction carries second format information and a second sending target identifier, where the first format information is used for indicating an OAM packet format; and further, the first network device 81 may further include a third processing unit, where the third processing unit is configured to generate a third OAM packet according to the second format information, and send the third OAM packet to a network device indicated by the second sending target identifier.

In this embodiment, the first format information includes at least one of the following:

packet sending frequency information, packet sending quantity information, time stamp information, counting information, and checking information.

Figure 10:
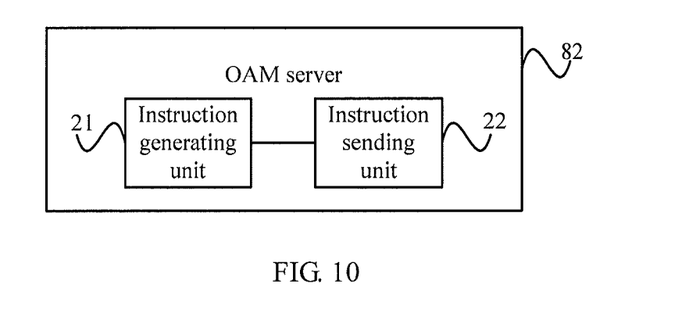
FIG. 10 is a schematic structural diagram of a first OAM server according to an embodiment of the present application.

FIG. 10 is a schematic structural diagram of a first OAM server according to an embodiment of the present application. As shown in FIG. 10, the OAM server 82 provided in this embodiment may specifically implement steps of a method for processing an OAM packet that is applied to an OAM server and provided in any embodiment of the present application, and a specific implementation process is not repeatedly described herein. The OAM server 82 provided in this embodiment specifically includes an instruction generating unit 21 and an instruction sending unit 22. The instruction generating unit 21 is configured to generate an operation, administration and maintenance (OAM) instruction, where the OAM instruction carries first format information and a first sending target identifier, where the first format information is used for indicating an OAM packet format. The instruction sending unit 22 is configured to send the OAM instruction to a first network device, so that the first network device generates a first OAM packet according to the first format information, and sends the first OAM packet to a network device indicated by the first sending target identifier. The OAM instruction is sent to the first network device.

According to the OAM server 82 provided in this embodiment, the OAM instruction is sent to a first network device, where the OAM server generates the OAM instruction and sends the OAM instruction to the first network device, and the first network device can generate an OAM packet according to format information carried in the OAM instruction that is sent by the OAM server 82, and for a different network device, send format information adapted to the network device, so that the network device can adapt to different OAM standards without changing of a hardware structure of the network device as long as a corresponding OAM processing capability is reserved in the network device, which greatly improves OAM processing flexibility.

Figure 11:
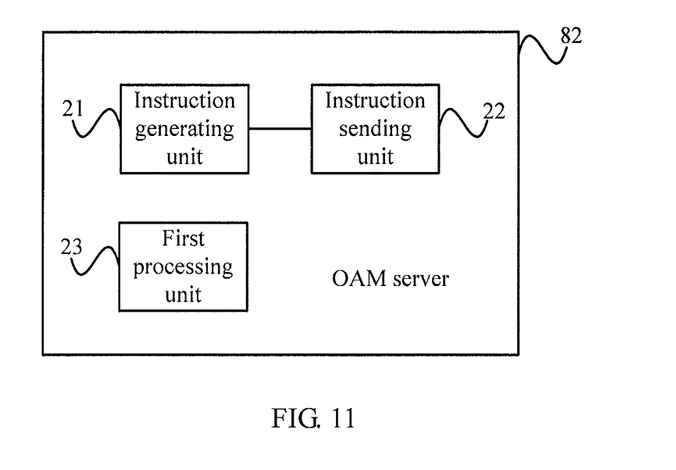
FIG. 11 is a schematic structural diagram of a second OAM server according to an embodiment of the present application.

FIG. 11 is a schematic structural diagram of a second OAM server according to an embodiment of the present application. As shown in FIG. 11, on a basis of the embodiment shown in FIG. 10, further, the OAM server 82 in this embodiment may further include a first processing unit 23, where the first processing unit 23 is configured to receive a second OAM packet sent by the first network device, and perform OAM processing according to the second OAM packet.

Figure 12:
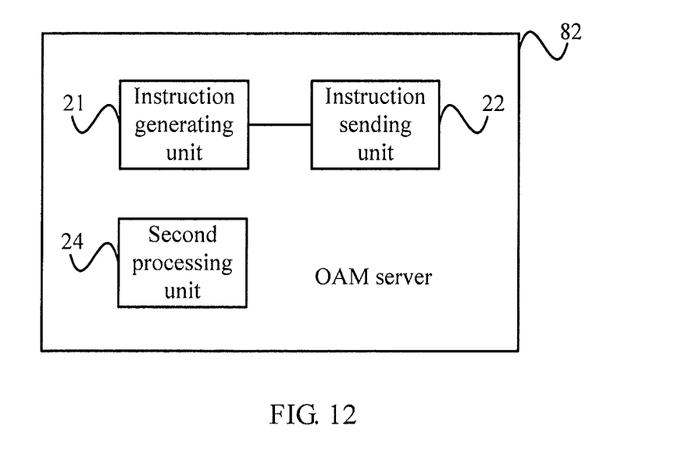
FIG. 12 is a schematic structural diagram of a third OAM server according to an embodiment of the present application.

FIG. 12 is a schematic structural diagram of a third OAM server according to an embodiment of the present application. As shown in FIG. 12, on a basis of the embodiment shown in FIG. 10, further, the OAM server 82 in this embodiment may further include a second processing unit 24, where the second processing unit 24 is configured to receive a second OAM packet sent by the first network device, and send a flow table constructing instruction to the first network device according to the second OAM packet, so that the first network device constructs an OAM flow table according to the flow table constructing instruction, where the OAM flow table includes a matching entry used for matching an OAM packet.

In this embodiment, the second processing unit 24 is further configured to receive a recording result sent by the first network device and perform OAM processing according to the recording result.

In this embodiment, the flow table constructing instruction may further carry second format information and a second sending target identifier, where the first format information is used for indicating an OAM packet format.

In this embodiment, the first format information includes at least one of the following: packet sending frequency information, packet sending quantity information, time stamp information, counting information, and checking information.

An embodiment of the present application provides a system for processing an OAM packet, where the system for processing an OAM packet specifically includes the first network device provided in any embodiment of the present application; and the OAM server provided in any embodiment of the present application.

Figure 13:
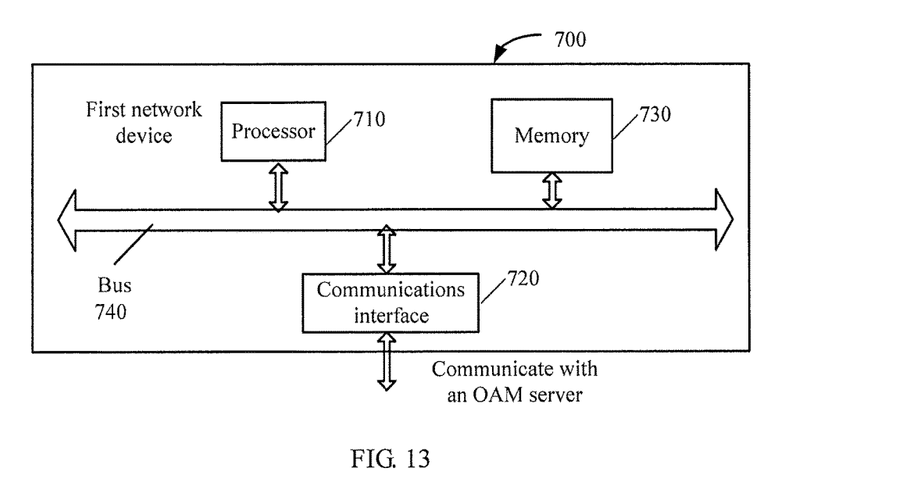
FIG. 13 is a schematic structural diagram of yet another first network device according to an embodiment of the present application.

FIG. 13 is a schematic structural diagram of yet another first network device according to an embodiment of the present application. As shown in FIG. 13, the first network device 700 provided in this embodiment may specifically implement steps of a method for processing an OAM packet that is applied to a network device and provided in any embodiment of the present application, and a specific implementation process is not repeatedly described herein. The first network device 700 provided in this embodiment specifically includes: a processor 710, a communications interface 720, a memory 730, and a bus 740, where the processor 710, the communications interface 720 and the memory 730 communicate with each other by using the bus 740. The communications interface 720 is configured to receive an operation, administration and maintenance (OAM) instruction sent by an OAM server, where the OAM instruction carries first format information and a first sending target identifier, where the first format information is used for indicating an OAM packet format; and send a first OAM packet to a network device indicated by the first sending target identifier. The memory 730 is configured to store an instruction. The processor 710 is configured to execute the instruction stored in the memory 730, where the processor 710 is configured to generate the first OAM packet according to the first format information.

In this embodiment, the communications interface 720 is further configured to receive a second OAM packet sent by a second network device, and send the second OAM packet to the OAM server, so that the OAM server performs OAM processing according to the second OAM packet.

In this embodiment, the communications interface 720 is further configured to receive the second OAM packet sent by the second network device; and the processor 710 is further configured to: if an OAM flow table corresponding to the second OAM packet is not stored, send the second OAM packet to the OAM server by using the communications interface 720, receive a flow table constructing instruction sent by the OAM server, and construct an OAM flow table according to the flow table constructing instruction, where the OAM flow table includes a matching entry used for matching an OAM packet.

In this embodiment, the processor 710 is further configured to: if the OAM flow table corresponding to the second OAM packet is stored, update a recording result according to the second OAM packet; and send the recording result to the OAM server, so that the OAM server performs OAM processing according to the recording result.

Figure 14:
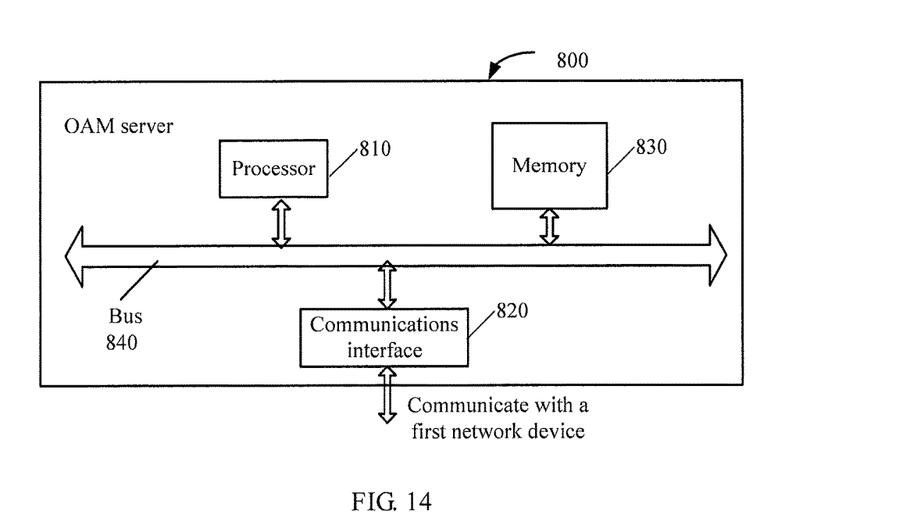
FIG. 14 is a schematic structural diagram of a fourth OAM server according to an embodiment of the present application.

FIG. 14 is a schematic structural diagram of a fourth OAM server according to an embodiment of the present application. As shown in FIG. 14, the OAM server 800 provided in this embodiment may specifically implement steps of a method for processing an OAM packet that is applied to an OAM server and provided in any embodiment of the present application, and a specific implementation process is not repeatedly described herein. The OAM server 800 provided in this embodiment specifically includes: a processor 810, a communications interface 820, a memory 830, and a bus 840, where the processor 810, the communications interface 820 and the memory 830 communicate with each other by using the bus 840. The communications interface 820 is configured to send an OAM instruction to a first network device, so that the first network device generates a first OAM packet according to first format information, and sends the first OAM packet to a network device indicated by a first sending target identifier. The memory 830 is configured to store an instruction. The processor 810 is configured to execute the instruction stored in the memory 830, where the processor 810 is configured to generate the OAM instruction, where the OAM instruction carries the first format information and the first sending target identifier, where the first format information is used for indicating an OAM packet format. The OAM instruction is sent to the first network device.

In this embodiment, the communications interface 820 is further configured to receive a second OAM packet sent by the first network device; and the processor 810 is further configured to perform OAM processing according to the second OAM packet.

In this embodiment, the communications interface 820 is further configured to receive the second OAM packet sent by the first network device, and the processor 810 is further configured to send a flow table constructing instruction to the first network device according to the second OAM packet by using the communications interface 820, so that the first network device constructs an OAM flow table according to the flow table constructing instruction, where the OAM flow table includes a matching entry used for matching an OAM packet.

In this embodiment, the communications interface 820 is further configured to receive a recording result sent by the first network device; and the processor 810 is further configured to perform OAM processing according to the recording result.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. A method for processing an operation, administration and maintenance (OAM) packet, comprising:
   receiving, by a first network device, an OAM instruction sent by an OAM server, wherein the OAM instruction comprises first format information indicating a first OAM packet format corresponding to at least one first OAM function implementation and a first sending target identifier;
   generating, by the first network device, a first OAM packet according to the first format information;
   sending, by the first network device, the first OAM packet to at least one corresponding network device indicated by the first sending target identifier; and
   receiving, by the first network device, a second OAM packet sent by a second network device, among the at least one corresponding network device, in response to the first OAM packet,
   wherein when the first network device does not include an OAM flow table corresponding to the second OAM packet of the second network device,
   by the first network device,
      sending the second OAM packet to the OAM server,
      receiving a flow table constructing instruction sent by the OAM server, the flow table constructing instruction including second format information indicating a second OAM packet format corresponding to at least one second OAM function implementation different from the at least one first OAM function implementation and a second sending target identifier, constructing the OAM flow table according to the flow table constructing instruction to include a matching entry used for matching to the second OAM packet in the second OAM packet format; and after the receiving the flow table constructing instruction sent by the OAM server, generating, a third OAM packet according to the second format information, and sending the third OAM packet to a third network device indicated by the second sending target identifier.

2. The method for processing an OAM packet according to claim 1, further comprising:

when the first network device includes the OAM flow table corresponding to the second OAM packet of the second network device, by the first network device, updating a recording result according to the second OAM packet, and sending the recording result to the OAM server, to cause the OAM server to perform OAM processing according to the recording result.

3. The method for processing an OAM packet according to claim 1, wherein the first format information comprises any one or combination of the following:

packet sending frequency information, packet sending quantity information, time stamp information, counting information, and checking information.

4. A method for processing an operation, administration and maintenance (OAM) packet, comprising:

generating, by an OAM server, an OAM instruction, wherein the OAM instruction comprises first format information indicating a first OAM packet format corresponding to at least one first OAM function implementation and a first sending target identifier;

sending, by the OAM server, the OAM instruction to a first network device, to cause the first network device to generate a first OAM packet according to the first format information, and send the first OAM packet to at least one corresponding network device indicated by the first sending target identifier;

receiving, by the OAM server from the first network device, a second OAM packet sent by the at least one corresponding network device in response to the first OAM packet; and sending, by the OAM server, a flow table constructing instruction to the first network device according to the second OAM packet, the flow table constructing instruction including second format information indicating a second OAM packet format corresponding to at least one second OAM function implementation different from the at least one first OAM function implementation and a second sending target identifier, to cause the first network device to construct an OAM flow table according to the flow table constructing instruction to include a matching entry used for matching to the second OAM packet in the second OAM packet format, wherein the second format information is used by the first network device to generate a third OAM packet and send the third OAM packet to a third network device indicated by the second sending target identifier.

5. The method for processing an OAM packet according to claim 4, further comprising:

receiving, by the OAM server, a recording result sent by the first network device, and performing OAM processing according to the recording result.

6. A first network device, comprising:

at least one processor to, receive an operation, administration and maintenance (OAM) instruction sent by an OAM server, wherein the OAM instruction comprises first format information indicating a first OAM packet format corresponding to at least one first OAM function implementation and a first sending target identifier;

generate a first OAM packet according to the first format information;

send the first OAM packet to at least one corresponding network device indicated by the first sending target identifier;

receive a second OAM packet sent by a second network device among the at least one corresponding network device, in response to the first OAM packet; and when an OAM flow table corresponding to the second OAM packet of the second network device not being included, send the second OAM packet to the OAM server, receive a flow table constructing instruction sent by the OAM server, the flow table constructing instruction including second format information indicating a second OAM packet format corresponding to at least one second OAM function implementation different from the at least one first OAM function implementation and a second sending target identifier, construct the OAM flow table according to the flow table constructing instruction to include a matching entry used for matching to the second OAM packet in the second OAM packet format, and the at least one processor is to:

generate a third OAM packet according to the second format information after receiving the flow table constructing instruction sent by the OAM server; and send the third OAM packet to a third network device indicated by the second sending target identifier.

7. The first network device according to claim 6, wherein the at least one processor to further, when the OAM flow table corresponding to the second OAM packet of the second network device being included, update a recording result according to the second OAM packet; and send the recording result to the OAM server, to cause the OAM server to perform OAM processing according to the recording result.

8. An operation, administration and maintenance (OAM) server, comprising:

at least one processor to, generate an OAM instruction, wherein the OAM instruction comprises first format information indicating a first OAM packet format corresponding to at least one first OAM function implementation and a first sending target identifier; and send the OAM instruction to a first network device, to cause the first network device to generate a first OAM packet according to the first format information, and send the first OAM packet to at least one corresponding network device indicated by the first sending target identifier;

receive, from the first network device, a second OAM packet sent by the at least one corresponding network device in response to the first OAM packet; and send a flow table constructing instruction to the first network device according to the second OAM packet, the flow table constructing instruction including second format information indicating a second OAM packet format corresponding to at least one second OAM function implementation different from the at least one first OAM function implementation and a second sending target identifier, to cause the first network device to construct an OAM flow table according to the flow table constructing instruction to include a matching entry used for matching to the second OAM packet in the second OAM packet format, wherein the second format information is used by the first network device to generate a third OAM packet and send the third OAM packet to a third network device indicated by the second sending target identifier.

\* \* \* \* \*